United States Patent
Kim et al.

(10) Patent No.: US 10,488,822 B2
(45) Date of Patent: Nov. 26, 2019

(54) SLIM BACKLIGHT UNIT FOR HOLOGRAPHIC DISPLAY DEVICE AND HOLOGRAPHIC DISPLAY DEVICE INCLUDING THE SAME

(71) Applicant: SAMSUNG ELECTRONICS CO., LTD., Suwon-si (KR)

(72) Inventors: Yunhee Kim, Seoul (KR); German B. Dubinin, Moscow area (RU); Alexander V. Morozov, Moscow area (RU); Sunil Kim, Seoul (KR); Hoon Song, Yongin-si (KR); Jungkwuen An, Cheonan-si (KR); Young Kim, Yongin-si (KR); Hongseok Lee, Seoul (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/391,298

(22) Filed: Dec. 27, 2016

(65) Prior Publication Data
US 2018/0032030 A1 Feb. 1, 2018

(30) Foreign Application Priority Data
Jul. 26, 2016 (KR) ........................ 10-2016-0094826

(51) Int. Cl.
| G02B 5/18 | (2006.01) |
| G03H 1/22 | (2006.01) |
| F21V 8/00 | (2006.01) |
| G02B 27/09 | (2006.01) |
| G02B 27/14 | (2006.01) |
| G02F 1/29 | (2006.01) |

(52) U.S. Cl.
CPC ........... *G03H 1/2286* (2013.01); *G02B 6/003* (2013.01); *G02B 6/0026* (2013.01);
(Continued)

(58) Field of Classification Search
CPC ................ G02B 6/0028; G02B 6/0046; G02B 27/0081; G02F 1/133621; G02F 1/29
(Continued)

(56) References Cited

U.S. PATENT DOCUMENTS

| 5,737,040 A | * | 4/1998 | Ichikawa .......... G02F 1/133621 349/106 |
| 7,101,048 B2 | | 9/2006 | Travis |

(Continued)

FOREIGN PATENT DOCUMENTS

| JP | 2007-219030 A | 8/2007 |
| JP | 5380733 B2 | 1/2014 |

(Continued)

*Primary Examiner* — Audrey Y Chang
(74) *Attorney, Agent, or Firm* — Sughrue Mion, PLLC

(57) ABSTRACT

A backlight unit for a binocular-holographic display device and a holographic display device including the same are provided. The backlight unit includes a light source unit which outputs light, a first beam expansion unit which expands, in a first direction, the light output from the light source unit, a second beam expansion unit which expands, in a second direction perpendicular to the first direction, the light output from the first beam expansion unit, and a beam deflection unit which diffracts light incident on the first beam expansion unit. The holographic display device includes the backlight unit, a field lens, and a spatial light modulator.

17 Claims, 9 Drawing Sheets

(52) U.S. Cl.
CPC ......... *G02B 6/0031* (2013.01); *G02B 6/0055* (2013.01); *G02B 6/0068* (2013.01); *G02B 6/0075* (2013.01); *G02B 6/0076* (2013.01); *G02B 6/0088* (2013.01); *G02B 27/0938* (2013.01); *G02B 27/141* (2013.01); *G02F 1/29* (2013.01); *G03H 1/2205* (2013.01); *G03H 1/2294* (2013.01); *G03H 2001/221* (2013.01); *G03H 2001/2226* (2013.01); *G03H 2001/2242* (2013.01); *G03H 2001/2292* (2013.01); *G03H 2222/34* (2013.01); *G03H 2222/50* (2013.01); *G03H 2223/16* (2013.01)

(58) Field of Classification Search
USPC .................. 359/34; 362/600, 601, 615, 616; 385/146
See application file for complete search history.

(56) References Cited

U.S. PATENT DOCUMENTS

| | | | |
|---|---|---|---|
| 7,379,651 | B2 | 5/2008 | Abu-Ageel |
| 8,348,489 | B2 * | 1/2013 | Holman ............... G02B 6/0028 313/508 |
| 8,548,290 | B2 * | 10/2013 | Travers .............. G02B 27/0081 359/34 |
| 2009/0052027 | A1 | 2/2009 | Yamada et al. |
| 2010/0220261 | A1 * | 9/2010 | Mizushima .......... G02B 6/0035 349/64 |
| 2012/0120467 | A1 | 4/2012 | Gruhlke et al. |
| 2013/0170004 | A1 * | 7/2013 | Futterer ............... G02B 6/0046 359/9 |
| 2014/0140654 | A1 * | 5/2014 | Brown ..................... G02F 1/29 385/10 |
| 2015/0268399 | A1 | 9/2015 | Futterer |
| 2016/0147003 | A1 | 5/2016 | Morozov et al. |
| 2016/0291544 | A1 | 10/2016 | Kroll et al. |

FOREIGN PATENT DOCUMENTS

| | | |
|---|---|---|
| KR | 10-2009-0020477 A | 2/2009 |
| KR | 10-2010-0017870 A | 2/2010 |
| KR | 10-2013-0131372 A | 12/2013 |
| KR | 10-2015-0079800 A | 7/2015 |
| KR | 10-2016-0060522 A | 5/2016 |

* cited by examiner

SLIM BACKLIGHT UNIT FOR HOLOGRAPHIC DISPLAY DEVICE AND HOLOGRAPHIC DISPLAY DEVICE INCLUDING THE SAME

CROSS-REFERENCE TO RELATED APPLICATION

This application claims priority from Korean Patent Application No. 10-2016-0094826, filed on Jul. 26, 2016, in the Korean Intellectual Property Office, the disclosure of which is incorporated herein in its entirety by reference.

BACKGROUND

1. Field

Apparatuses consistent with exemplary embodiments relate to a backlight unit and a holographic display device including the same, and more particularly, a slim backlight unit for a binocular-holographic display device and a slim-holographic display device including the same.

2. Description of the Related Art

Methods of realizing three-dimensional (3D) images such glasses-type methods and non-glasses-type methods are widely used. Examples of glasses-type methods include polarizing glasses-type methods and shutter glasses-type methods, and examples of the non-glasses-type methods include lenticular methods and parallax barrier methods. These methods utilized the principle of binocular parallax, and increasing the number of viewpoints is limited. In addition, these methods may make the viewers feel tired due to the difference between the depth perceived by the brain and the focus of the eyes.

Recently, holographic display techniques, which are 3D image display methods capable of making the depth perceived by the brain consistent with the focus of the eyes and providing full parallax, have been gradually put to practical use. According to a holographic display technique, when reference light is irradiated onto a hologram pattern, having recorded thereon an interference pattern obtained by interference between object light reflected from an original object and the reference light, the reference light is diffracted and an image of the original object is reproduced. When a currently-commercialized holographic display technique is used, a computer-generated hologram (CGH), rather than a hologram pattern obtained by directly exposing an original object to light, is provided as an electric signal to a spatial light modulator. Then, the spatial light modulator forms a hologram pattern and diffracts reference light according to the input CGH signal, thereby generating a 3D image.

However, a very high resolution spatial light modulator and a very large amount of data processing are required to implement a perfect holographic display technique. Recently, to relax the requirements for data processing amount and for resolution, a binocular hologram technique of providing hologram images to only a viewing zone corresponding to both eyes of the observer has been proposed. For example, a hologram image having a viewpoint corresponding to a left-eye viewing zone of the observer and a hologram image having a viewpoint corresponding to a right-eye viewing zone of the observer are generated and provided to the left and right eyes of the observer, respectively. No hologram image for other viewpoints is generated, and thus, the data processing amount may be greatly reduced, and a currently-commercialized display apparatus may satisfy a resolution condition of the spatial light modulator.

SUMMARY

One or more exemplary embodiments may provide a slim backlight unit for a binocular-holographic display device and a slim-holographic display device including the same.

Additional exemplary aspects and advantages will be set forth in part in the description which follows and, in part, will be apparent from the description, or may be learned by practice of the presented embodiments.

According to an aspect of an exemplary embodiment, a backlight unit includes a light source unit configured to provide light, a first beam expansion unit configured to expand the light provided from the light source unit in a first direction and thereby output light with a line-shaped cross section, the first beam expansion unit including a first light guide plate transmitting light in the first direction, a second beam expansion unit configured to expand the light with the line-shaped cross section, output from the first beam expansion unit, in a second direction perpendicular to the first direction, thereby outputting light with a rectangular cross section, the second beam expansion unit including a second light guide plate transmitting light in the second direction, and a beam deflection unit disposed on an optical path between the light source unit and the first beam expansion unit, the beam deflection unit being configured to two-dimensionally control a path of the light incident thereon.

The first and second beam expansion units may be disposed in a same plane.

The light source unit may include a first light source unit configured to provide light of a first wavelength, a second light source unit configured to provide light of a second wavelength that is different from the first wavelength, and a third light source unit configured to provide light of a third wavelength that is different from the first and second wavelengths.

The first, second, and third light source units may be sequentially disposed along the second direction facing a side surface of the first light guide plate.

The first beam expansion unit may include a first input coupler configured to transmit the light of the first wavelength into the first light guide plate, a first output coupler configured to emit the light of the first wavelength from the first light guide plate, a second input coupler configured to transmit the light of the second wavelength into the first light guide plate, a second output coupler configured to emit the light of the second wavelength from the first light guide plate, a third input coupler configured to transmit the light of the third wavelength into the first light guide plate, and a third output coupler configured to emit the light of the third wavelength from the first light guide plate.

The first beam expansion unit may further include a mirror configured to reflect the light of the first wavelength output from the first output coupler, a first dichroic mirror configured to reflect the light of the second wavelength output from the second output coupler and transmit the light of the first wavelength, and a second dichroic mirror configured to reflect the light of the third wavelength output from the third output coupler and transmit the light of the first and second wavelengths.

The beam deflection unit may include a first horizontal beam deflector and a first vertical beam deflector configured to face the first input coupler and adjust an angle of the light of the first wavelength incident on the first input coupler, a second horizontal beam deflector and a second vertical beam deflector configured to face the second input coupler and adjust an angle of the light of the second wavelength incident on the second input coupler, and a third horizontal beam deflector and a third vertical beam deflector configured to face the third input coupler and adjust an angle of the light of the third wavelength incident on the third input coupler.

At least one of the first horizontal beam deflector and the first vertical beam deflector may be a liquid crystal deflector which diffracts light incident thereon and thereby outputs two light beams at different respective angles. At least one of the second horizontal beam deflector and the second vertical beam deflector may be a liquid crystal deflector which diffracts light incident thereon and thereby outputs two light beams at different respective angles. At least one of the third horizontal beam deflector and the third vertical beam deflector may be a liquid crystal deflector which diffracts light incident thereon and thereby outputs two light beams at different respective angles.

The first, second, and through third horizontal beam deflectors may be sequentially disposed along the second direction on the first light guide plate. The first, second, and third vertical beam deflectors may be respectively and sequentially disposed in the second direction on the first light guide plate. The first, second, and third output couplers may be respectively and sequentially disposed in the second direction on the first light guide plate.

The second beam expansion unit may include a fourth input coupler configured to transmit light from the first beam expansion unit into the second light guide plate, and a fourth output coupler configured to emit light from the second light guide plate.

The second beam expansion unit may further include a mirror configured to reflect light from the first beam expansion unit to the fourth input coupler.

The first and second beam expansion units may be rotatable with respect to each other and the mirror may be adjustable according to a relative angle between the first and second beam expansion units.

The first beam expansion unit may be disposed under the second beam expansion unit to face the fourth input coupler.

The first beam expansion unit may include a first wavelength beam expansion unit configured to expand the light of the first wavelength provided from the first light source unit in a first direction and thereby output light with a line-shaped cross section, a second wavelength beam expansion unit disposed on the first wavelength beam expansion unit, the second wavelength beam expansion unit being configured to expand the light of the second wavelength provided from the first light source unit in a first direction and thereby output light with a line-shaped cross section, and a third wavelength beam expansion unit disposed on the third wavelength beam expansion unit, the third wavelength beam expansion unit being configured to expand the light of the third wavelength provided from the first light source unit in a first direction and thereby output light with a line-shaped cross section.

The first wavelength beam expansion unit may include a first wavelength light guide plate, and a first input coupler and a first output coupler disposed on an upper surface of the first wavelength light guide plate, the second wavelength beam expansion unit may include a second wavelength light guide plate, the second input coupler and the second output coupler disposed on an upper surface of the second wavelength light guide plate, the third wavelength beam expansion unit may include a third wavelength light guide plate, the third input coupler and the third output coupler disposed on an upper surface of the third wavelength light guide plate, and the first, second, and third output couplers may overlap the fourth input coupler in a view as seen from above.

The first light source unit may be disposed to face a first side surface of the first light guide plate, the second light source unit may be disposed to face a second side surface of the second light guide plate opposite the first side surface, and the third light source unit may be disposed to face the first side surface of the third light guide plate, and the first and third wavelength light guide plates may be shifted in a first direction with respect to the second wavelength light guide plate.

The second wavelength light guide plate may be longer than the third wavelength light guide plate and may protrude in a first direction with respect to the third wavelength light guide plate, and the first wavelength light guide plate may be longer than the second wavelength light guide plate and may protrude in the first direction with respect to the second wavelength light guide plate.

The first beam expansion unit may include two first input couplers configured to transmit the light of the first wavelength into the first light guide plate and respectively disposed on first and second edges of an upper surface of the first light guide plate, a first output coupler configured to emit the light of the first wavelength from the first light guide plate, two second input couplers configured to transmit the light of the second wavelength into the first light guide plate and respectively disposed on the first and second edges of the upper surface of the first light guide plate, a second output coupler configured to emit the light of the second wavelength from the first light guide plate, two third input couplers configured to transmit the light of the third wavelength into the first light guide plate and respectively disposed on the first and second edges of the upper surface of the first light guide plate, and a third output coupler configured to emit the light of the third wavelength from the first light guide plate.

The beam deflection unit may include two first horizontal beam deflectors and two first vertical beam deflectors configured to face the first input coupler and adjust an angle of the light of the first wavelength incident on the first input coupler, and respectively disposed on the first and second edges of the upper surface of the first light guide plate, two second horizontal beam deflectors and two second vertical beam deflectors configured to face the second input coupler and adjust an angle of the light of the second wavelength incident on the second input coupler, and respectively disposed on the first and second edges of the upper surface of the first light guide plate, and two third horizontal beam deflectors and two third vertical beam deflectors configured to face the third input coupler and adjust an angle of the light of the third wavelength incident on the third input coupler, and respectively disposed on the first and second edges of the upper surface of the first light guide plate.

The first, second, and third light source units may be disposed on a same side surface of the first light guide plate.

Each of the first, second, and third light source units may be alternately disposed on the first and second side surfaces of the first light guide plate.

According to an aspect of another exemplary embodiment, a holographic display device includes a light source unit configured to output a coherent light beam, a first beam expansion unit configured to expand the light beam provided from the light source unit in a first direction and thereby output light with a line-shaped cross section, the first beam expansion unit including a first light guide plate transmitting light in the first direction, a second beam expansion unit configured to expand the light with a line-shaped cross section provided from the first beam expansion unit in a second direction perpendicular to the first direction and thereby output light with a rectangular cross section, the second beam expansion unit including a second light guide plate transmitting light in the second direction, a beam deflection unit disposed on an optical path between the light source unit and the first beam expansion unit, the beam deflection unit being configured to two-dimensionally control a path of light incident thereon, a spatial light modulator configured to diffract incident light and reproduce a hologram image, and a field lens configured to focus the hologram image reproduced by the spatial light modulator onto a predetermined space.

BRIEF DESCRIPTION OF THE DRAWINGS

These and/or other exemplary aspects and advantages will become apparent and more readily appreciated from the following description of the embodiments, taken in conjunction with the accompanying drawings in which.

DETAILED DESCRIPTION

Figure 1:
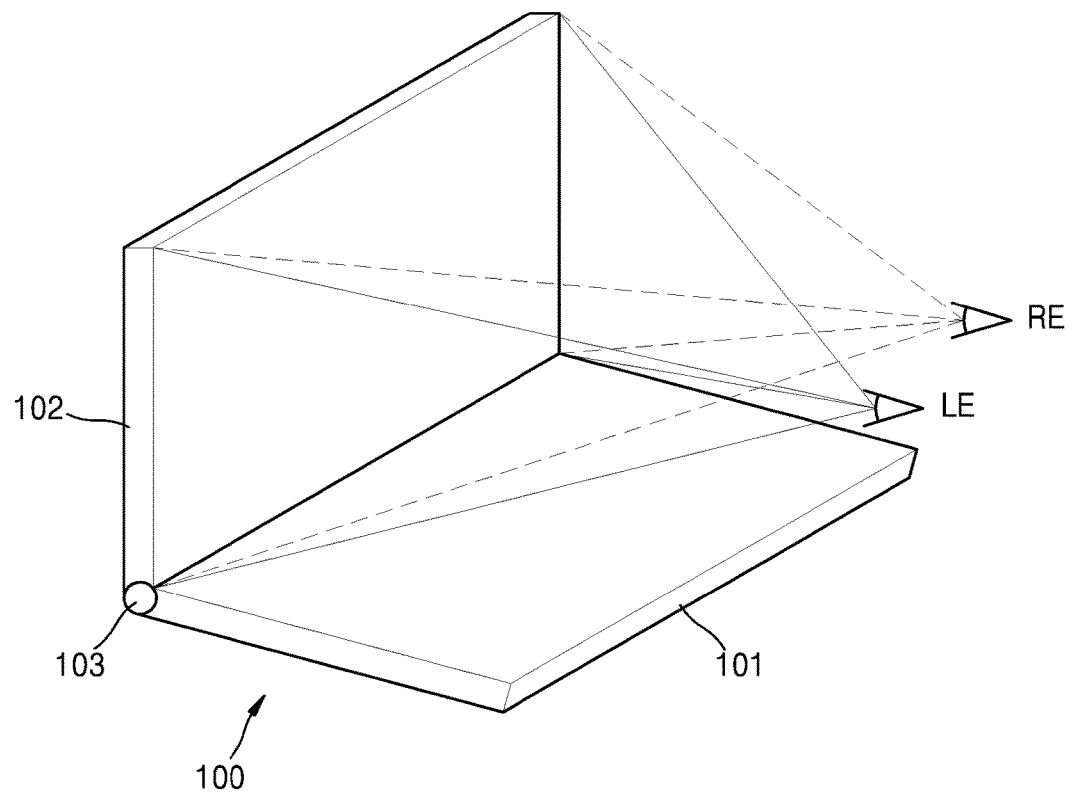
FIG. 1 is a schematic perspective view of a holographic display device according to an exemplary embodiment.

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

Hereinafter, with reference to the accompanying drawings, a slim backlight unit for a holographic display device and a holographic display device including the same will be described in detail. Like reference numerals refer to like elements throughout, and in the drawings, sizes of elements may be exaggerated for clarity and convenience of explanation. The embodiments described below are merely exemplary, and various modifications may be possible from the embodiments. In a layer structure described below, an expression such as "above" or "on" may include not only the meaning of "immediately on/under/to the left/to the right in a contact manner", but also the meaning of "on/under/to the left/to the right in a non-contact manner".

FIG. 1 is a schematic perspective view of a holographic display device 100 according to an exemplary embodiment. Referring to FIG. 1, the holographic display device 100 according to this exemplary embodiment may include first and second housings 101 and 102 that are foldable about a hinge 103. The first housing 101 may generate a hologram image through a spatial light modulator, described below, and may project the hologram image on a predetermined space. According to the present embodiment, the holographic display device 100 may provide a left-eye LE and a right-eye RE of an observer with hologram images having different viewpoints, respectively, by using a binocular hologram technique. For example, the holographic display device 100 may provide a hologram image for the left-eye to a left-eye LE viewing zone of an observer, and may provide a hologram image for the right-eye to a right-eye RE viewing zone of the observer, wherein a viewpoint of the hologram image for the right-eye is different from that of the hologram image for the left-eye.

Unlike images for the left-eye and images for the right-eye according to a stereoscopic technique, the hologram images for the left-eye and right-eye provided from the holographic display device 100 may enable the observer to perceive a three-dimensional (3D) effect independently while having different viewpoints. The stereoscopic technique may provide a 3D effect by using binocular parallax when a two-dimensional (2D) image for the left-eye and a 2D image for the right-eye, which have different viewpoints, are respectively perceived by the left and right eyes of an observer. Therefore, according to the stereoscopic technique, a 3D effect may not be generated by only one of the images for the left-eye and the images for the right-eye, and, in such a situation, the observer may feel tired due to the difference between the depth perceived by the brain and the focus of the eyes. Meanwhile, the holographic display device 100 may respectively form a hologram image for the left-eye and a hologram image for the right-eye in a predetermined space, that is, a left-eye LE viewing zone and a right-eye RE viewing zone of the observer, and thus, the depth perceived by the brain may coincide with the focus of the eyes and full parallax may be provided. The holographic display device 100 according to the present embodiment provides only a binocular viewpoint because an observer may perceive only two viewpoints with left and right eyes, and thus, may reduce a data processing amount by removing remaining viewpoint information except for viewpoint information perceived by the observer.

Figure 2:
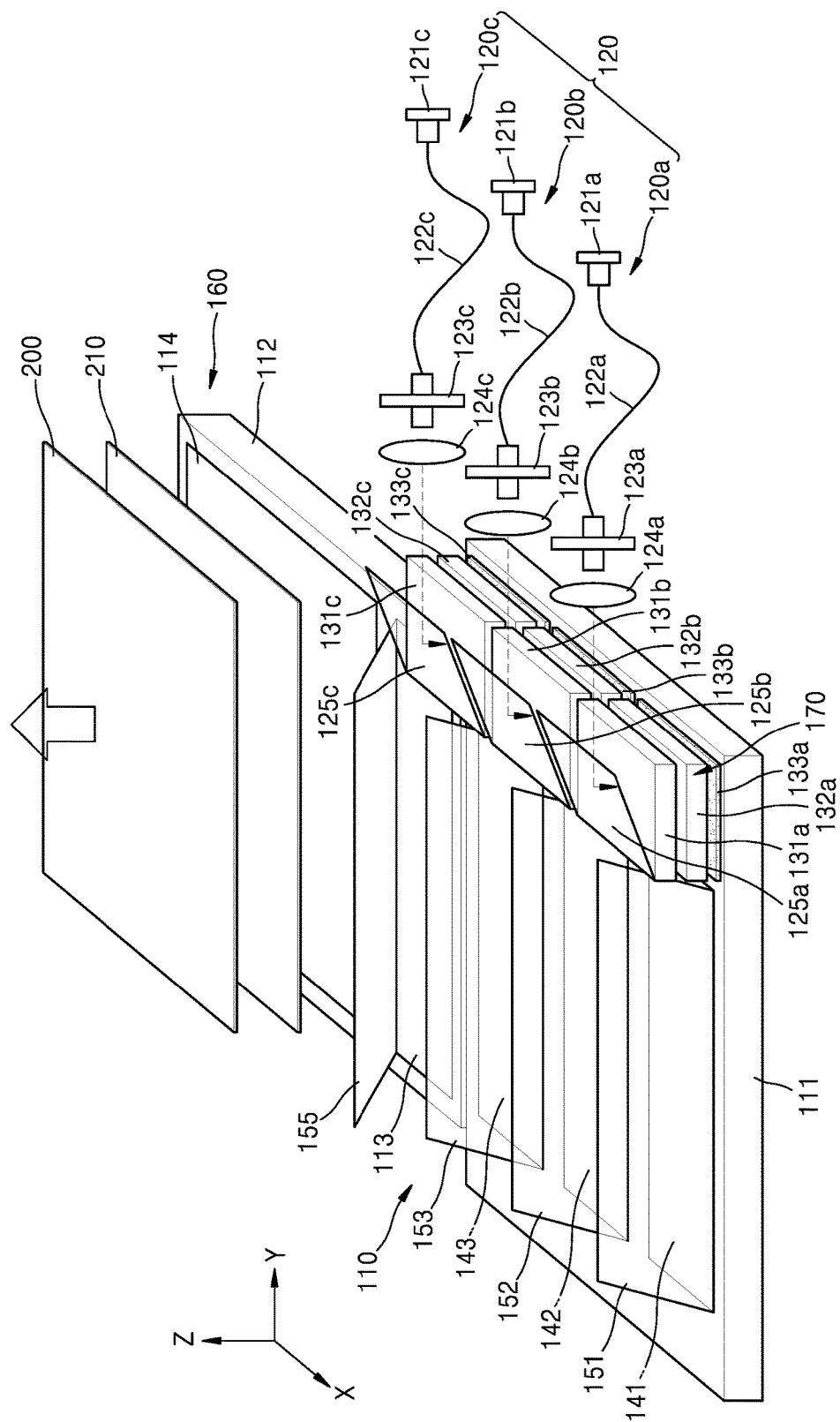
FIG. 2 is a detailed perspective view of a specific configuration of the holographic display device of FIG. 1.

FIG. 2 is a detailed perspective view of a specific configuration of the holographic display device 100 of FIG. 1. Referring to FIG. 2, the holographic display device 100 according to the present embodiment may include a light source unit 120 providing one or more coherent light beams, a first beam expansion unit 110 expanding the one or more light beams in a first direction and providing light having a line-shaped cross section, a second beam expansion unit 160 expanding the light with the line-shaped cross section in a second direction perpendicular to the first direction and providing light having a rectangular cross section, a beam deflection unit 170 disposed in an optical path between the light source unit 120 and the first beam expansion unit 110 and two-dimensionally controlling a path of light incident thereon, a spatial light modulator 200 diffracting light and reproducing a hologram image, and a field lens 210 focusing the hologram image reproduced by the spatial light modulator 200 on a predetermined space. FIG. 2 illustrates that the field lens 210 is disposed between the spatial light modulator 200 and the second beam expansion unit 160, but the position of the field lens 210 is not limited thereto. For example, the field lens 210 may alternately be disposed in front of the spatial light modulator 200.

The light source unit 120, the first beam expansion unit 110, and the second beam expansion unit 160 may constitute the backlight unit of the holographic display device 100. The light source unit 120 and the first beam expansion unit 110 may be disposed in the first housing 101 of FIG. 1, and the second beam expansion unit 160, the field lens 210, and the spatial light modulator 200 may be disposed in the second housing 102. Though not shown in FIG. 2, various control circuits generating an image signal and including an image signal processor may be distributed in one or both of the first and second housings 101 and 102.

The light source unit 120 may include a first light source unit 120a providing light of a first wavelength, a second light source unit 120b providing light of a second wavelength that is different from the first wavelength, and a third light source unit 120c providing light of a third wavelength that is different from the first and second wavelengths. For example, the first through third light source units 120a to 120c may respectively provide light of different wavelengths such as blue, green, and red light. As illustrated in FIG. 2, the first through third light source units 120a to 120c may be disposed facing a side surface of the first beam expansion unit 110, and may be sequentially disposed in a longitudinal direction, that is, an −x direction, as shown in FIG. 2.

The first light source unit 120a may include a first light source 121a emitting light of a first wavelength, a first light transmission member 122a transmitting the light of the first wavelength emitted from the first light source 121a, a first light output member 123a outputting the light of the first wavelength to the outside, a first collimating lens 124a collimating the light of the first wavelength, and a first mirror 125a reflecting the light of the first wavelength to the first beam expansion unit 110. Furthermore, the second light source unit 120b may include a second light source 121b emitting light of a second wavelength, a second light transmission member 122b transmitting the light of the second wavelength emitted from the second light source 121b, a second light output member 123b outputting the light of the second wavelength to the outside, a second collimating lens 124b collimating the light of the second wavelength, and a second mirror 125b reflecting the light of the second wavelength to the first beam expansion unit 110. The third light source unit 120c may include a third light source 121c emitting light of a third wavelength, a third light transmission member 122c transmitting the light of the third wavelength emitted from the third light source 121c, a third light output member 123c outputting the light of the third wavelength to the outside, a third collimating lens 124c collimating the light of the third wavelength, and a third mirror 125c reflecting the light of the third wavelength to the first beam expansion unit 110. In such a structure, light emitted from the first through third light sources 121a to 121c may be expanded to a certain degree by the first through third collimating lenses 124a to 124c and may be provided to the first beam expansion unit 110.

Laser diodes generating light having high coherence may be used as the first through third light sources 121a to 121c. However, light-emitting diodes (LEDs) may also be used as the first through third light sources 121a to 121c because light may be sufficiently diffracted and modulated by the spatial light modulator 200 as long as the light has a certain degree of spatial coherence. Any other light sources may alternately be used as the first through third light sources 121a to 121c as long as the light sources emit light that has a certain degree of spatial coherence.

FIG. 2 illustrates that the light of the first through third wavelengths are finally provided to the first beam expansion unit 110 through the mirrors 125a to 125c, but the mirrors 125a to 125c may be omitted depending on an exemplary embodiment. For example, the light transmission members 122a to 122c may be extended to an upper surface of the first beam expansion unit 110, and the light output members 123a to 123c and the collimating lenses 124a to 124c may respectively face the upper surface of the first beam expansion unit 110. The light transmission members 122a to 122c may be, for example, optical fiber, but may also be an arrangement of a plurality of mirrors or relay lenses.

The first beam expansion unit 110 converts a light beam provided from the light source unit 120 into light having a line-shaped cross section by expanding the light beam in a width direction, that is, a y direction. For example, the first beam expansion unit 110 may include a first light guide plate 111 including a transparent material and transmitting light in a width direction thereof by total internal reflection, a first input coupler 133a transmitting the light of the first wavelength in the first light guide plate 111, a first output coupler 141 emitting the light of the first wavelength to the outside of the first light guide plate 111, a second input coupler 133b transmitting the light of the second wavelength in the first light guide plate 111, a second output coupler 142 emitting the light of the second wavelength to the outside of the first light guide plate 111, a third input coupler 133c transmitting the light of the third wavelength in the first light guide plate 111, a third output coupler 143 emitting the light of the third wavelength to the outside of the first light guide plate 111, a fourth mirror 151 reflecting the light of the first wavelength from the first output coupler 141, a first dichroic mirror 152 reflecting the light of the second wavelength from the second output coupler 142 and transmitting the light of the first wavelength, and a second dichroic mirror 153 reflecting the light of the third wavelength from the third output coupler 143 and transmitting the light of the first and second wavelengths.

Meanwhile, the beam deflection unit 170 may include first through third horizontal beam deflectors 131a to 131c and first through third vertical beam deflectors 132a to 132c respectively disposed between the mirrors 125a to 125c and the input couplers 133a to 133c. In particular, the horizontal beam deflectors 131a to 131c and the vertical beam deflectors 132a to 132c may be disposed to respectively face the input couplers 133a to 133c. The horizontal beam deflectors 131a to 131c may deflect incident light to adjust a position of the reproduced hologram image in a horizontal direction, and the vertical beam deflectors 132a to 132c may deflect incident light to adjust a position of the reproduced hologram image in a vertical direction. FIG. 2 illustrates that the horizontal beam deflectors 131a to 131c are disposed on the vertical beam deflectors 132a to 132c, but may also be disposed under the vertical beam deflectors 132a to 132c.

The light of the first wavelength reflected from the first mirror 125a may be incident on the first input coupler 133a after passing through the first horizontal beam deflector 131a and the first vertical beam deflector 132a. An incident angle of the light of the first wavelength incident on the first input coupler 133a may be adjusted by the first horizontal beam deflector 131a and the first vertical beam deflector 132a. Furthermore, the second horizontal beam deflector 131b and the second vertical beam deflector 132b may adjust an incident angle of the light of the second wavelength incident on the second input coupler 133b, and the third horizontal beam deflector 131c and the third vertical beam deflector 132c may adjust an incident angle of the light of the third wavelength incident on the third input coupler 133c.

In the same manner as the light source units 120a to 120c, the horizontal beam deflectors 131a to 131c, the vertical beam deflectors 132a to 132c, the input couplers 133a to 133c, and the output couplers 141 to 143 may be sequentially disposed in a longitudinal direction, that is, an −x direction, as shown in FIG. 2. FIG. 2 illustrates that the input couplers 133a to 133c are disposed on an edge of an upper surface of the first light guide plate 111, but the inventive concept is not limited thereto. For example, the input couplers 133a to 133c may be disposed on a side surface of the first light guide plate 111. The horizontal beam deflectors 131a to 131c and the vertical beam deflectors 132a to 132c may also be disposed on the side surface of the first light guide plate 111 to face the input couplers 133a to 133c.

Figure 3:
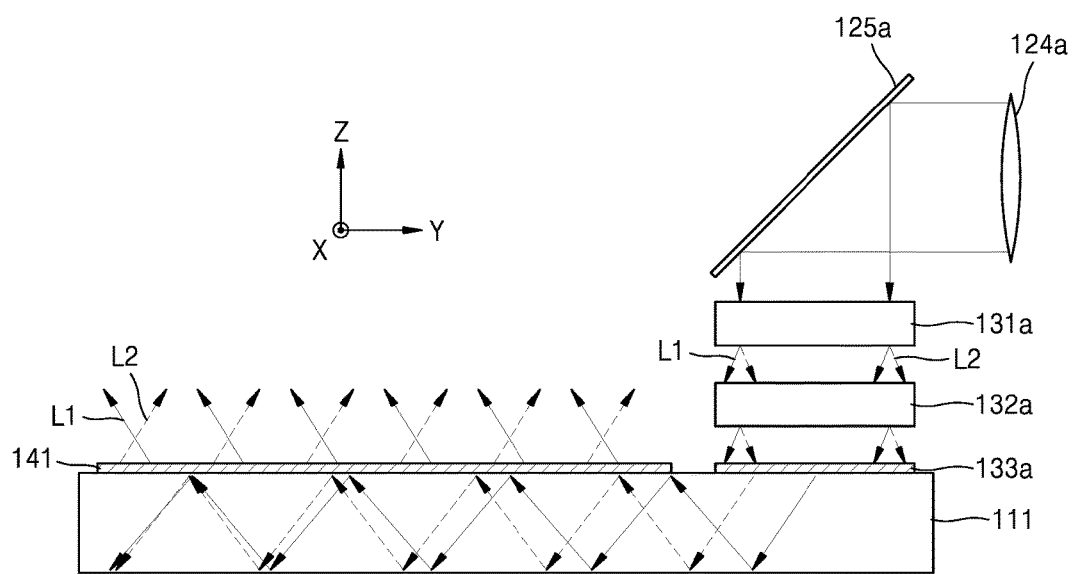
FIG. 3 is a cross-sectional view in a width direction of the holographic display device of FIG. 2.

FIG. 3 is a cross-sectional view in a width direction of the holographic display device 100 of FIG. 2. In particular, FIG. 3 illustrates a cross-section taken in a y direction of the first input coupler 133a and the first output coupler 141 of the first beam expansion unit 110. Referring to FIG. 3, the light of the first wavelength that entered the first light guide plate 111 by the first input coupler 133a may travel in the first light guide plate 111 in a width direction, that is, a −y direction, by total reflection. In the process, a portion of the light of the first wavelength incident on the first output coupler 141 may be emitted to the upper surface of the first light guide plate 111. Therefore, the light of the first wavelength may expand in a width direction. The first input coupler 133a and the first output coupler 141 may be diffraction optical elements diffracting and transmitting some of the incident light.

Meanwhile, as illustrated in FIG. 3, the first horizontal beam deflector 131a may be a liquid crystal deflector forming two light beams L1 and L2 traveling at different angles by diffracting the incident light. The two light beams L1 and L2 may be incident on the first input coupler 133a at different angles, and may travel in the first light guide plate 111 at different angles. As a result, emission angles of the two light beams L1 and L2 emitted through the first output coupler 141 may be different from each other. The two light beams L1 and L2 may respectively finally travel to the left and right eyes of the observer as illustrated in FIG. 1 after passing through the second beam expansion unit 160 and the spatial light modulator 200. The first vertical beam deflector 132a, instead of the first horizontal beam deflector 131a may be a liquid crystal deflector, or both the first horizontal beam deflector 131a and the first vertical beam deflector 132a may be liquid crystal deflectors. The above description of the first horizontal beam deflector 131a, the first vertical beam deflector 132a, the first input coupler 133a, and the first output coupler 141 related to the light of the first wavelength may be applied in the same manner to the second horizontal beam deflector 131b, the second vertical beam deflector 132b, the second input coupler 133b, and the second output coupler 142 related to the light of the second wavelength, and the third horizontal beam deflector 131c, the third vertical beam deflector 132c, the third input coupler 133c, and the third output coupler 143 related to the light of the third wavelength.

Figure 4:
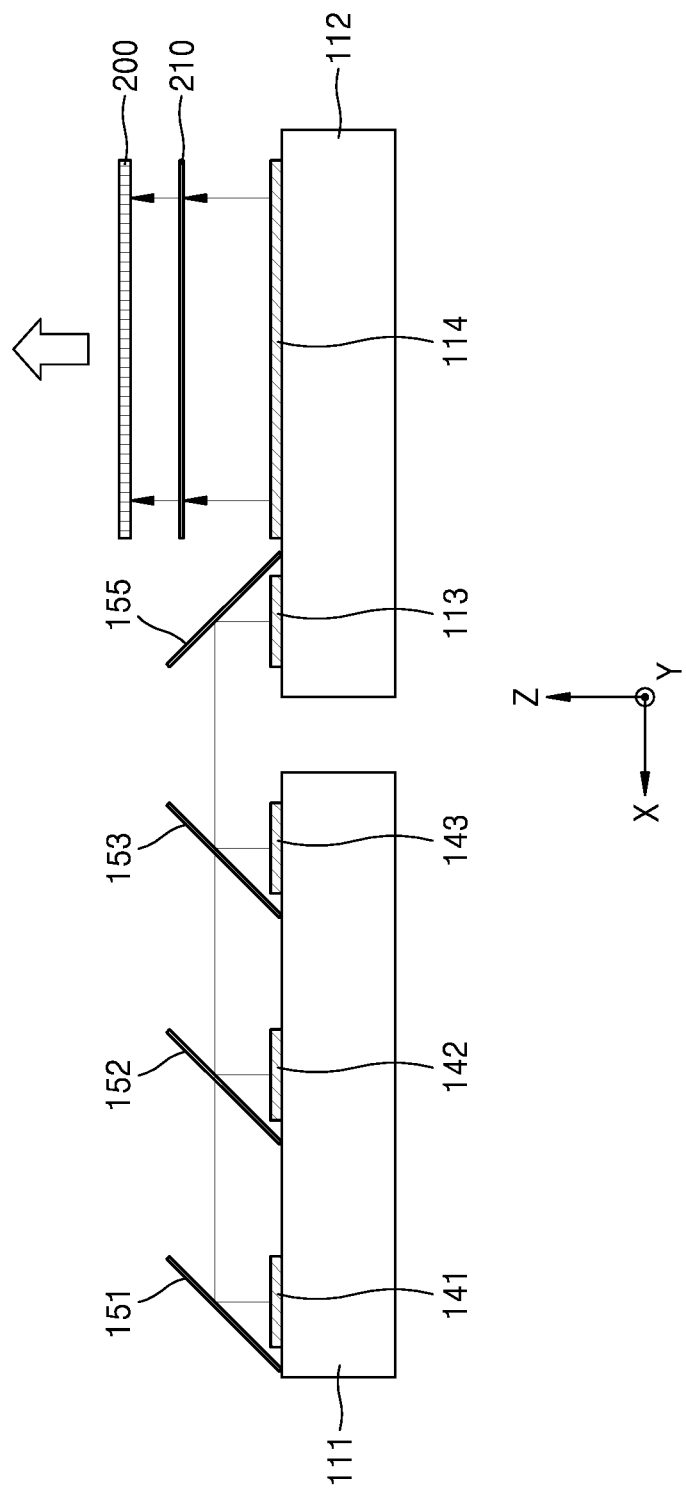
FIG. 4 is a cross-sectional view in a longitudinal direction of the holographic display device of FIG. 2.

FIG. 4 is a cross-sectional view in a longitudinal direction of the holographic display device 100 of FIG. 2 to cut center portions of the first, second, and third output couplers 141, 142, and 143. In particular, FIG. 4 illustrates a cross-section taken in an x direction of a center portion of the first beam expansion unit 110, the second beam expansion unit 160, the field lens 210, and the spatial light modulator 200. Referring to FIG. 4, the light of the first wavelength emitted by the first output coupler 141 may be reflected to the second beam expansion unit 160 by the fourth mirror 151. Next, the light of the first wavelength may be incident on the fifth mirror 155 after being transmitted through the first and second dichroic mirrors 152 and 153. Furthermore, the light of the second wavelength emitted by the second output coupler 142 may be reflected to the second beam expansion unit 160 by the first dichroic mirror 152. Next, the light of the second wavelength may be incident on the fifth mirror 155 after being transmitted through the second dichroic mirror 153. The light of the third wavelength emitted by the third output coupler 143 may be reflected to the second beam expansion unit 160 by the second dichroic mirror 153 and may be incident on the fifth mirror 155.

The second beam expansion unit 160 converts light, having a line-shaped cross section, provided from the first beam expansion unit 110, into light having a rectangular cross section, by expanding the light with the line-shaped cross section in a longitudinal direction, that is, an x direction. For example, the second beam expansion unit 160 may include a second light guide plate 112 including a transparent material and transmitting light in a longitudinal direction by total reflection, a fourth input coupler 113 transmitting light in the second light guide plate 112, a fourth output coupler 114 emitting light to the outside of the second light guide plate 112, a fifth mirror 155 reflecting the light from the first beam expansion unit 110 to the fourth input coupler 113.

As illustrated in FIG. 4, the light of the first through third wavelengths may be incident together on the fourth input coupler 113 after being reflected by the fifth mirror 155. The light incident on the second light guide plate 112 by the fourth input coupler 113 may travel in the second light guide plate 112 in a longitudinal direction, that is, an −x direction, by total internal reflection. In other words, the path of light in the second light guide plate 112 may be perpendicular to the path of light in the first light guide plate 111. In the process, a portion of the light incident on the fourth output coupler 114 may be emitted to the upper surface of the second light guide plate 112. Therefore, light may expand in a longitudinal direction. The fourth input coupler 113 and the fourth output coupler 114 may be diffraction optical elements diffracting and transmitting some of the incident light.

Lastly, the light emitted from the second beam expansion unit 160 may be incident on the spatial light modulator 200 through the field lens 210. The spatial light modulator 200 may form a hologram pattern with an interference fringe for modulating the incident light. A hologram image may be reproduced on a predetermined space by diffracting and modulating the incident light by the hologram pattern formed in the spatial light modulator 200.

According to the inventive concept, a slim-backlight unit may be manufactured because the first and second beam expansion units 110 and 160 are disposed in the same plane. Therefore, it is possible to manufacture a binocular holographic display device 100 providing holographic images with different viewpoints to two respective viewing zones with a small thickness. Furthermore, since a backlight unit according to the present exemplary embodiment may simultaneously deflect the two light beams L1 and L2, the two light beams L1 and L2 having different paths may be simultaneously provided to the spatial light modulator 200 by using a space division method instead of a time division method, and thus, quality of the hologram images may be improved. Furthermore, color dispersion may be suppressed since the first beam expansion unit 110 expands and deflects each of the light of the first through third wavelengths.

Figure 5:
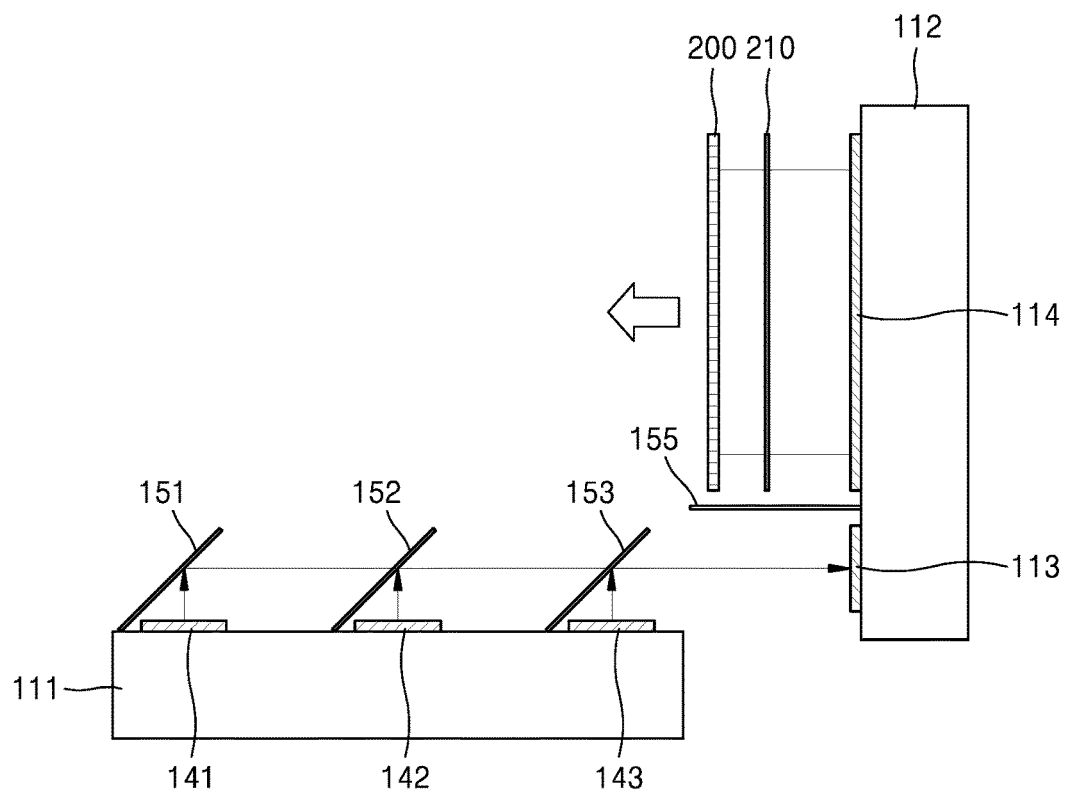
FIG. 5 is a cross-sectional view of first and second beam expansion units rotating with respect to each other in the holographic display device of FIG. 2.

FIG. 5 is a cross-sectional view of the first and second beam expansion units 110 and 160 rotating with respect to each other in the holographic display device 100 of FIGS. 1 and 2. As described in FIG. 1, the first and second housings 101 and 102 may be foldable with respect to each other through the hinge 103. For example, when the first and second housings 101 and 102 are folded at 90 degrees, the first beam expansion unit 110 disposed in the first housing 101 may form an angle of 90 degrees with respect to the second beam expansion unit 160 disposed in the second housing 102. Therefore, the light traveling from the first beam expansion unit 110 to the second beam expansion unit 160 may be incident on the fourth input coupler 113 without the fifth mirror 155. Therefore, as illustrated in FIG. 5, the fifth mirror 155 may rotate in order not to block the light traveling to the second beam expansion unit 160 and may be deviated from a traveling path of the light. Furthermore, in order for the light from the first beam expansion unit 110 to be incident on the fourth input coupler 113 at a suitable angle, a tilt angle of the fifth mirror 155 may be adjusted according to a relative angle between the first and second beam expansion units 110 and 160.

Figure 6:
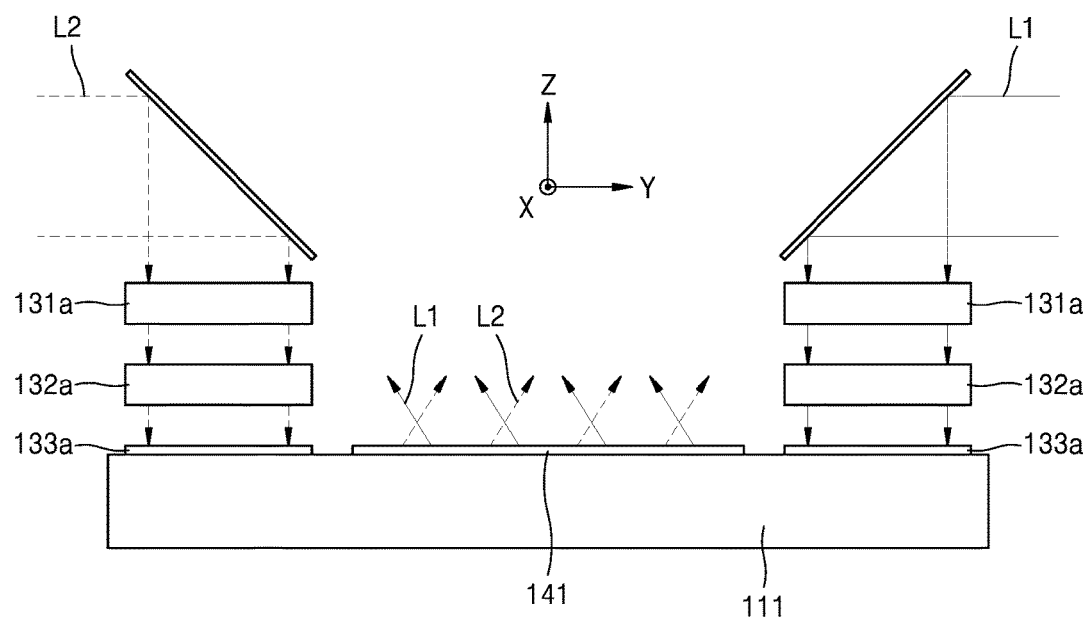
FIG. 6 is a cross-sectional view in a width direction of a holographic display device according to another exemplary embodiment.

FIG. 6 is a cross-sectional view in a width direction of a holographic display device according to another exemplary embodiment. In particular, FIG. 6 illustrates a cross-section taken in a y direction of the first input coupler 133a and the first output coupler 141 of the first beam expansion unit 110. Referring to FIG. 6, the first beam expansion unit 110 may include two first horizontal beam deflectors 131a, two first vertical beam deflectors 132a, and two first input couplers 133a that are respectively disposed first and second edges of the upper surface of the light guide plate 111.

In the exemplary embodiment of FIG. 3, the first horizontal beam deflector 131a, the first vertical beam deflector 132a, and the first input coupler 133a are disposed on a single edge of the first light guide plate 111, and make the two light beams L1 and L2 travel along paths having different angles by using a liquid crystal deflector. However, according to the exemplary embodiment of FIG. 6, the first light source unit 120a may make the two light beams L1 and L2, and may provide the first light beam L1 to a right side of the first light guide plate 111 and may provide the second light beam L2 to a left side of the first light guide plate 111. For example, the first light source unit 120a may divide an output terminal of the first light transmission member 122a into two or may divide light into the two light beams L1 and L2 by using a half mirror or a beam splitter. Therefore, the first light beam L1 may be emitted by the first output coupler 141 after traveling in a right-to-left direction in the first light guide plate 111, and the second light beam L2 may be emitted by the second output coupler 142 after traveling in a left-to-right direction in the first light guide plate 111. In this case, it is also possible to use a galvano-mirror instead of a liquid crystal deflector for the first horizontal beam deflector 131a and the first vertical beam deflector 132a. Furthermore, a liquid crystal deflector may be used for the first horizontal beam deflector 131a and the first vertical beam deflector 132a to reduce a thickness of a backlight unit.

Meanwhile, the embodiment of FIG. 2 illustrates that the light source units 120a to 120c are disposed in the same side surface of the first light guide plate 111, and thus, the horizontal beam deflectors 131a to 131c, the vertical beam deflectors 132a to 132c, and the input couplers 133a to 133c are disposed in the same side surface of the first light guide plate 111. However, the light source units 120a to 120c may be distributed to two opposite side surfaces of the first light guide plate 111.

Figure 7:
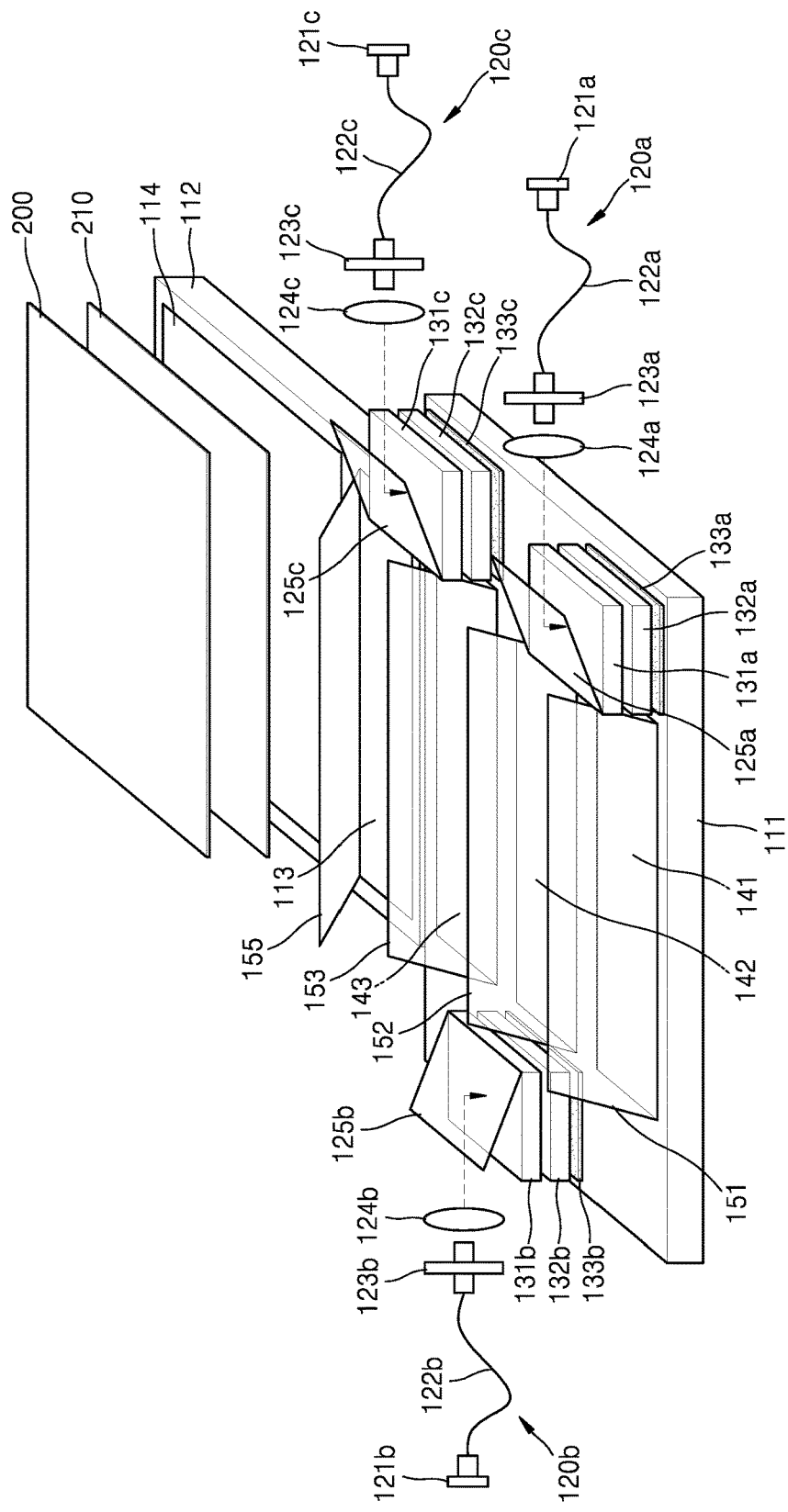
FIG. 7 is a perspective view of a configuration of a holographic display device according to another exemplary embodiment.

For example, FIG. 7 is a perspective view of a configuration of a holographic display device according to another exemplary embodiment. Referring to FIG. 7, the first and third light source units 120a and 120c may be disposed on a right side of the first light guide plate 111, and the second light source unit 120b may be disposed on a left side of the first light guide plate 111. Therefore, the first and third horizontal beam deflectors 131a and 131c, the first and third vertical beam deflectors 132a and 132c, and the first and third input couplers 133a and 133c may be disposed on the right side of the first light guide plate 111. Furthermore, the second horizontal beam deflector 131b, the second vertical beam deflector 132b, and the second input coupler 133b may be disposed on the left side of the first light guide plate 111.

Figure 8:
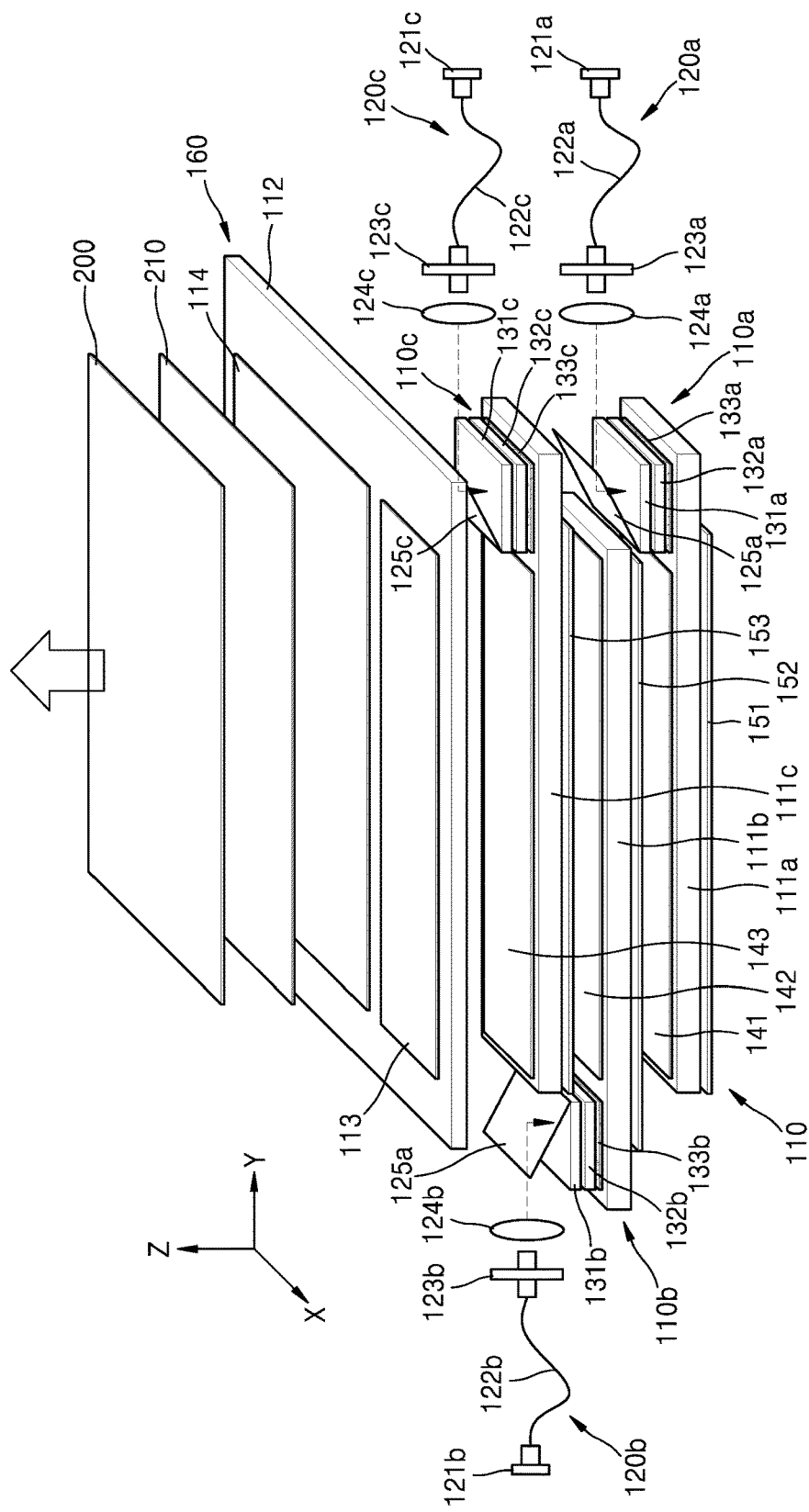
FIG. 8 is a perspective view of a configuration of a holographic display device according to another exemplary embodiment.

According to the exemplary embodiment described above, the first and second beam expansion units 110 and 160 are disposed in the same plane. However, it is possible to stack the first and second beam expansion units 110 and 160. For example, FIG. 8 is a perspective view of a configuration of a holographic display device according to another exemplary embodiment. Referring to FIG. 8, the first beam expansion unit 110 may be disposed under the second beam expansion unit 160. In particular, the first beam expansion unit 110 may face the fourth input coupler 113 under the second beam expansion unit 160.

Furthermore, the first beam expansion unit 110 may include first through third wavelength beam expansion units 110a to 110c divided according to respective wavelengths and stacked. The first wavelength beam expansion unit 110a converts the light of the first wavelength provided from the first light source unit 120a into light with a line-shaped cross section by expanding in a width direction, that is, a y direction. Furthermore, the second wavelength beam expansion unit 110b converts the light of the second wavelength provided from the second light source unit 120b into light with a line-shaped cross section by expanding in a width direction, and the third wavelength beam expansion unit 110c converts the light of the third wavelength provided from the third light source unit 120c into light with a line-shaped cross section by expanding in a width direction.

The first wavelength beam expansion unit 110a may include a first wavelength light guide plate 111a, the first input coupler 133a and the first output coupler 141 disposed on an upper surface of the first wavelength light guide plate 111a, and the fourth mirror 151 disposed on a lower surface of the first wavelength light guide plate 111a. Most of the light of the first wavelength is emitted from the upper surface of the first wavelength light guide plate 111a by the first output coupler 141, but a portion of the light may be emitted from the lower surface of the first wavelength light guide plate 111a. The fourth mirror 151 may improve light use efficiency by reflecting the light emitted from the lower surface of the first wavelength light guide plate 111a. Alternatively, the first output coupler 141 may reflect light to the lower surface of the first wavelength light guide plate 111a, and the fourth mirror 151 may reflect the light emitted from the lower surface of the first wavelength light guide plate 111a.

The second wavelength beam expansion unit 110b may be disposed immediately above the first wavelength beam expansion unit 110a. The second wavelength beam expansion unit 110b may include a second wavelength light guide plate 111b, the second input coupler 133b and the second output coupler 142 disposed on an upper surface of the second wavelength light guide plate 111b, and the first dichroic mirror 152 disposed on a lower surface of the second wavelength light guide plate 111b. Most of the light of the second wavelength is emitted from the upper surface of the second wavelength light guide plate 111b by the second output coupler 142, but a portion of the light may be emitted from the lower surface of the second wavelength light guide plate 111b. The first dichroic mirror 152 may improve light use efficiency by reflecting the light of the second wavelength emitted from the lower surface of the second wavelength light guide plate 111b. Furthermore, the first dichroic mirror 152 may transmit the light of the first wavelength from the first wavelength beam expansion unit 110a. Alternatively, the second output coupler 142 may reflect light to the lower surface of the second wavelength light guide plate 111b, and the first dichroic mirror 152 may reflect the light emitted from the lower surface of the second wavelength light guide plate 111b.

The third wavelength beam expansion unit 110c may be disposed immediately above the second wavelength beam expansion unit 110b. The third wavelength beam expansion unit 110c may include a third wavelength light guide plate 111c, the third input coupler 133c and the third output coupler 142 disposed on an upper surface of the third wavelength light guide plate 111c, and the second dichroic mirror 153 disposed on a lower surface of the third wavelength light guide plate 111c. Most of the light of the third wavelength is emitted from the upper surface of the third wavelength light guide plate 111c by the third output coupler 143, but a portion of the light may be emitted from the lower surface of the third wavelength light guide plate 111c. The second dichroic mirror 153 may improve light use efficiency by reflecting the light of the third wavelength emitted from the lower surface of the third wavelength light guide plate 111c. Furthermore, the second dichroic mirror 153 may transmit the light of the first and second wavelengths from the first and second wavelength beam expansion units 110a and 110b. Alternatively, the third output coupler 143 may reflect light to the lower surface of the third wavelength light guide plate 111c, and the second dichroic mirror 153 may reflect the light emitted from the lower surface of the third wavelength light guide plate 111c.

In the stack structures, the first, second, and third light source units 120a to 120c may be alternately disposed on first and second side surfaces of the first beam expansion unit 110 so as to reduce the thicknesses of the backlight unit and the holographic display device. For example, the first light source unit 120a may be disposed on a right side of the first wavelength beam expansion unit 110a, the second light source unit 120b may be disposed on a left side of the second wavelength beam expansion unit 110b, and the third light source unit 120c may be disposed on a right side of the third wavelength beam expansion unit 110c. Therefore, the first horizontal beam deflector 131a, the first vertical beam deflector 132a, and the first input coupler 133a may be disposed on the right side of the first wavelength light guide plate 111a, the second horizontal beam deflector 131b, the second vertical beam deflector 132b, and the second input coupler 133b may be disposed on the left side of the second wavelength light guide plate 111b, and the third horizontal beam deflector 131c, the third vertical beam deflector 132c, and the third input coupler 133c may be disposed on the right side of the third wavelength light guide plate 111c.

Furthermore, the positions of first, second, and third wavelength light guide plates 111a to 111c may be shifted toward the first, second, and third light source units 120a to 120c, respectively. For example, the first and third wavelength light guide plates 111a and 110c may each be shifted rightward, and the second wavelength light guide plate 111b may be shifted leftward. As a result, spaces for each of the first horizontal beam deflector 131a and the first vertical beam deflector 132a, and the third horizontal beam deflector 131c and the third vertical beam deflector 132c may be provided as the first and third wavelength light guide plates 111a and 110c protrude rightward. Furthermore, spaces for each of the second vertical beam deflector 132b and the second input coupler 133b may be provided as the second wavelength light guide plate 111b protrudes leftward. The positions of the first, second, and third output couplers 141 to 143 may not be shifted even if the positions of the first, second, and third wavelength light guide plates 111a to 111c are shifted in the above-described manner. For example, the first, second, and third output couplers 141 to 143 may overlap the fourth input coupler 113 of the second light guide plate 112, as seen from above. Therefore, the light of the first, second, and third wavelengths, respectively emitted by the first, second, and third output couplers 141 to 143 may be incident on the fourth input coupler 113 without loss.

Figure 9:
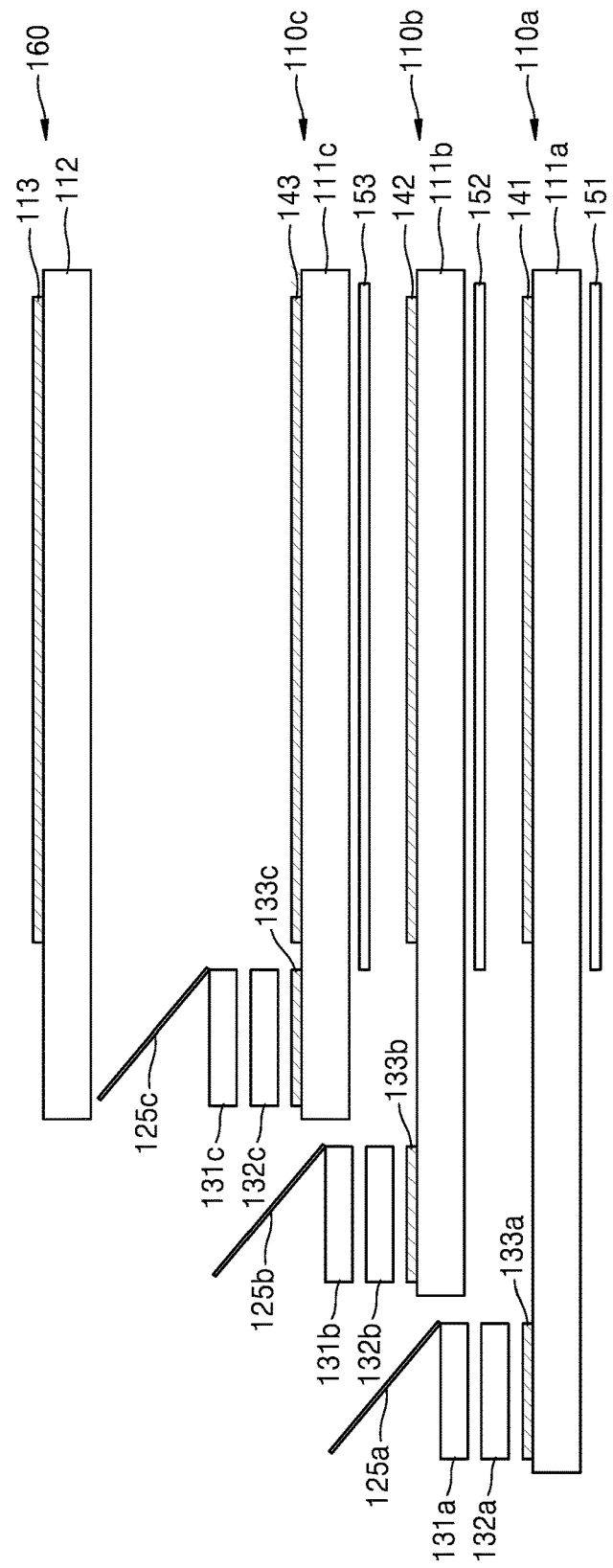
FIG. 9 is a cross-sectional view in a width direction of a holographic display device according to another exemplary embodiment.

FIG. 9 is a cross-sectional view in a width direction of a holographic display device according to another exemplary embodiment. In the same manner as the exemplary embodiment of FIG. 8, the first beam expansion unit 110 and the second beam expansion unit 160 are stacked in the holographic display device of FIG. 9. However, in the exemplary embodiment of FIG. 9, each of the first, second, and third light source units 120a to 120c are disposed on the same side surface of the first beam expansion unit 110, in contrast to the arrangement of the exemplary embodiment of FIG. 8. For example, the first, second, and third light source units 120a to 120c may be disposed on the left side of the first, second, and third wavelength beam expansion units 110a to 110c, respectively.

In such an arrangement, the lower light guide plate may further protrude leftward to reduce thicknesses of the backlight unit and the holographic display device. For example, the second wavelength light guide plate 111b, disposed under the third wavelength light guide plate 111c, may be longer than the third wavelength light guide plate 111c and may protrude further leftward than the third wavelength light guide plate. Furthermore, the first wavelength light guide plate 111a, disposed under the second wavelength light guide plate 111b, may be the longest of the first, second, and third wavelength light guide plates, and may protrude further leftward than the second wavelength light guide plate 111b. Each of the first, second, and third output couplers 141 to 143 may overlap the fourth input coupler 113 of the second light guide plate 112 in a view as seen from above.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A backlight unit comprising:
   a light source configured to output light of a first wavelength, light of a second wavelength that is different from the first wavelength, and light of a third wavelength that is different from the first wavelength and the second wavelength;
a first beam expander configured to expand, in a first direction, the light output from the light source and thereby output provide light with a line-shaped cross section, the first beam expander comprising a first light guide plate which transmits light incident thereon in the first direction;
a second beam expander configured to expand, in a second direction perpendicular to the first direction, the light with the line-shaped cross section, output by the first beam expander and thereby output light with a rectangular cross section, the second beam expander comprising a second light guide plate which transmits light incident thereon in the second direction; and
a beam deflector disposed on an optical path between the light source and the first beam expander, the beam deflector being configured to two-dimensionally control a path of light output therefrom,
wherein the first beam expander comprises a plurality of input couplers, a plurality of output couplers, and a plurality of mirrors,
wherein the plurality of input couplers and the plurality of output couplers are disposed on a same surface of the first beam expander, and the plurality of mirrors are respectively disposed on the plurality of output couplers to direct the light that is output from the plurality of output couplers in a direction perpendicular to the surface of the first beam expander, toward the second beam expander,
wherein the beam deflector comprises a first beam deflector configured to two-dimensionally control an angle of light of the first wavelength made incident on the first beam expander, a second beam deflector configured to two-dimensionally control an angle of light of the second wavelength made incident on the first beam expander, and a third beam deflector configured to two-dimensionally control an angle of light of the third wavelength made incident on the first beam expander, and
wherein the first beam deflector, the second beam deflector, and the third beam deflector are sequentially disposed along the second direction on the first light guide plate.

2. The backlight unit of claim 1, wherein
the first beam expander and the second beam expander are disposed on a same plane.

3. The backlight unit of claim 1, wherein
the light source comprises a first light source configured to output the light of the first wavelength, a second light source configured to output the light of the second wavelength that is different from the first wavelength, and a third light source configured to output the light of the third wavelength.

4. The backlight unit of claim 3, wherein
the first light source, the second light source, and the third light source are sequentially disposed along the second direction facing a side surface of the first light guide plate.

5. The backlight unit of claim 3, wherein the plurality of input couplers and the plurality of output couplers of the first beam expander comprise:
a first input coupler configured to transmit the light of the first wavelength into the first light guide plate;
a first output coupler configured to emit the light of the first wavelength from the first light guide plate;
a second input coupler configured to transmit the light of the second wavelength into the first light guide plate;
a second output coupler configured to emit the light of the second wavelength from the first light guide plate;
a third input coupler configured to transmit the light of the third wavelength into the first light guide plate; and
a third output coupler configured to emit the light of the third wavelength from the first light guide plate.

6. The backlight unit of claim 5, wherein:
the first beam deflector comprises a first horizontal beam deflector and a first vertical beam deflector, each positioned to adjust an angle of the light of the first wavelength incident on the first input coupler,
the second beam deflector comprises a second horizontal beam deflector and a second vertical beam deflector, each positioned to adjust an angle of the light of the second wavelength incident on the second input coupler, and
the third beam deflector comprises a third horizontal beam deflector and a third vertical beam deflector, each positioned to adjust an angle of the light of the third wavelength incident on the third input coupler.

7. The backlight unit of claim 6, wherein
at least one of the first horizontal beam deflector and the first vertical beam deflector is a liquid crystal deflector which diffracts light incident thereon and thereby outputs two light beams at different respective angles,
at least one of the second horizontal beam deflector and the second vertical beam deflector is a liquid crystal deflector which diffracts light incident thereon and thereby outputs two light beams at different respective angles, and
at least one of the third horizontal beam deflector and the third vertical beam deflector is a liquid crystal deflector which diffracts light incident thereon and thereby outputs two light beams at different respective angles.

8. The backlight unit of claim 6, wherein
the first horizontal beam deflector, the second horizontal beam deflector, and the third horizontal beam deflector are sequentially disposed along the second direction on the first light guide plate,
the first vertical beam deflector, the second vertical beam deflector, and the third vertical beam deflector are sequentially disposed along the second direction on the first light guide plate,
the first input coupler, the second input coupler, and the third input coupler are sequentially disposed along the second direction on the first light guide plate, and
the first output coupler, the second output coupler, and the third output coupler are sequentially disposed along the second direction on the first light guide plate.

9. The backlight unit of claim 5, wherein
the second beam expander comprises a fourth input coupler configured to transmit light output from the first beam expander into the second light guide plate, and a fourth output coupler configured to emit light from the second light guide plate.

10. The backlight unit of claim 9, wherein
the second beam expander further comprises a mirror configured to reflect light output from the first beam expander into the fourth input coupler.

11. The backlight unit of claim 10, wherein
the first beam expander is rotatable with respect to the second beam expander,
the second beam expander is rotatable with respect to the first beam expander, and a tilt of the mirror is adjustable according to a relative angle between the first beam expander and the second beam expander.

12. The backlight unit of claim 3, wherein the first beam expander comprises:
a first input coupler and a second input coupler, each configured to transmit the light of the first wavelength into the first light guide plate, wherein the first input coupler is disposed on a first edge of an upper surface of the first light guide plate, and the second input coupler is disposed on a second edge of the upper surface of the first light guide plate;
a first output coupler configured to emit the light of the first wavelength from the first light guide plate;
a third input coupler and a fourth input coupler, each configured to transmit the light of the second wavelength into the first light guide plate, wherein the third input coupler is disposed on the first edge of the upper surface of the first light guide plate, and the fourth input coupler is disposed on the second edge of the upper surface of the first light guide plate;
a second output coupler configured to emit the light of the second wavelength from the first light guide plate;
a fifth input coupler and a sixth input coupler, each configured to transmit the light of the third wavelength into the first light guide plate, wherein the fifth input coupler is disposed on the first edge of the upper surface of the first light guide plate, and the sixth input coupler is disposed on the second edge of the first light guide plate; and
a third output coupler configured to emit the light of the third wavelength from the first light guide plate.

13. The backlight unit of claim 12, wherein the beam deflector comprises:
a first horizontal beam deflector, disposed on the first edge of the upper surface of the first light guide plate, configured to face the first input coupler and adjust an angle of the light of the first wavelength incident on the first input coupler;
a second horizontal beam deflector, disposed on the second edge of the upper surface of the first light guide plate, configured to face the second input coupler and adjust an angle of the light of the first wavelength incident on the second input coupler;
a third horizontal beam deflector, disposed on the first edge of the upper surface of the first light guide plate, configured to face the third input coupler and adjust an angle of the light of the second wavelength incident on the third input coupler;
a fourth horizontal beam deflector, disposed on the second edge of the upper surface of the first light guide plate, configured to face the fourth input coupler and adjust an angle of the light of the second wavelength incident on the fourth input coupler;
a fifth horizontal beam deflector, disposed on the first edge of the upper surface of the first light guide plate, configured to face the fifth input coupler and adjust an angle of the light of the third wavelength incident on the fifth input coupler; and
a sixth horizontal beam deflector, disposed on the second edge of the upper surface of the first light guide plate, configured to face the sixth input coupler and adjust an angle of the light of the third wavelength incident on the sixth input coupler.

14. The backlight unit of claim 3, wherein the first light source, the second light source, and the third light source are disposed on a the same side surface of the first light guide plate.

15. The backlight unit of claim 3, wherein the first light source is disposed on a first side surface of the first light guide plate, the second light source is disposed on a second side surface of the first light guide plate, and the third light source is disposed on the first side surface of the first light guide plate.

16. A holographic display device comprising:
a light source configured to output coherent light of a first wavelength, light of a second wavelength that is different from the first wavelength, and light of a third wavelength that is different from the first wavelength and the second wavelength;
a first beam expander configured to expand, in a first direction, a light beam output from the light source and thereby output light with a line-shaped cross section, wherein the first beam expander comprises a first light guide plate which transmits light in the first direction;
a second beam expander configured to expand, in a second direction perpendicular to the first direction, the light with a line-shaped cross section output from the first beam expander and thereby output light with a rectangular cross section, wherein the second beam expander comprises a second light guide plate which transmits light in the second direction;
a beam deflector disposed on an optical path between the light source and the first beam expander, wherein the beam deflector is configured to two-dimensionally control a path of light incident thereon;
a spatial light modulator configured to diffract light incident thereon and thereby reproduce a hologram image; and
a field lens configured to focus the hologram image, output from the spatial light modulator, onto a predetermined space,
wherein the first beam expander comprises a plurality of input couplers, a plurality of output couplers, and a plurality of mirrors,
wherein the plurality of input couplers and the plurality of output couplers are disposed on a same surface of the first beam expander, and the plurality of mirrors are respectively disposed on the plurality of output couplers to direct the light that is output from the plurality of output couplers in a direction perpendicular to the surface of the first beam expander, toward the second beam expander,
wherein the beam deflector comprises a first beam deflector configured to two-dimensionally control an angle of light of the first wavelength made incident on the first beam expander, a second beam deflector configured to two-dimensionally control an angle of light of the second wavelength made incident on the first beam expander, and a third beam deflector configured to two-dimensionally control an angle of light of the third wavelength made incident on the first beam expander, and
wherein the first beam deflector, the second beam deflector, and the third beam deflector are sequentially disposed along the second direction on the first light guide plate.

17. A backlight unit comprising:
a light source configured to output light of a first wavelength, light of a second wavelength that is different from the first wavelength, and light of a third wavelength that is different from the first wavelength and the second wavelength;
a first beam expander configured to expand, in a first direction, the light output from the light source and thereby output provide light with a line-shaped cross section, the first beam expander comprising a first light guide plate which transmits light incident thereon in the first direction;
a second beam expander configured to expand, in a second direction perpendicular to the first direction, the light with the line-shaped cross section, output by the first beam expander and thereby output light with a rectangular cross section, the second beam expander comprising a second light guide plate which transmits light incident thereon in the second direction; and
a beam deflector disposed on an optical path between the light source and the first beam expander, the beam deflector being configured to two-dimensionally control a path of light output therefrom,
wherein the beam deflector comprises a first beam deflector configured to two-dimensionally control an angle of light of the first wavelength made incident on the first beam expander, a second beam deflector configured to two-dimensionally control an angle of light of the second wavelength made incident on the first beam expander, and a third beam deflector configured to two-dimensionally control an angle of light of the third wavelength made incident on the first beam expander, and
wherein the first beam deflector, the second beam deflector, and the third beam deflector are sequentially disposed along the second direction on the first light guide plate,
wherein the first beam expander comprises:
a first input coupler configured to transmit the light of the first wavelength into the first light guide plate;
a first output coupler configured to emit the light of the first wavelength from the first light guide plate;
a second input coupler configured to transmit the light of the second wavelength into the first light guide plate;
a second output coupler configured to emit the light of the second wavelength from the first light guide plate;
a third input coupler configured to transmit the light of the third wavelength into the first light guide plate; and
a third output coupler configured to emit the light of the third wavelength from the first light guide plate, and
wherein the backlight unit further comprises:
a mirror configured to reflect the light of the first wavelength output from the first output coupler;
a first dichroic mirror configured to reflect the light of the second wavelength output from the second output coupler and to transmit the light of the first wavelength; and
a second dichroic mirror configured to reflect the light of the third wavelength output from the third output coupler and to transmit the light of the first wavelength and the light of the second wavelength.

* * * * *